Figure 4:
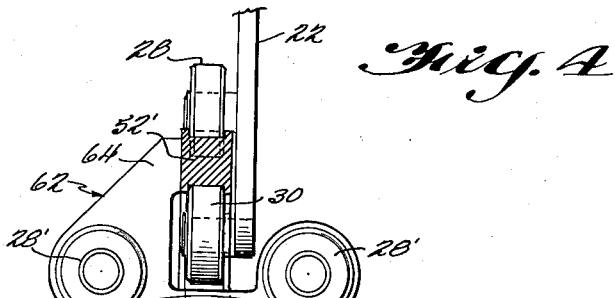

July 4, 1961  R. H. MUSTONEN  2,990,617
COMPENSATING PROBE TIP
Filed March 13, 1959
2 Sheets-Sheet 1
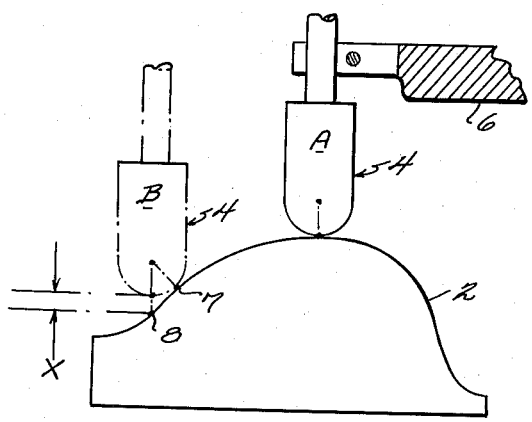
Fig. 1
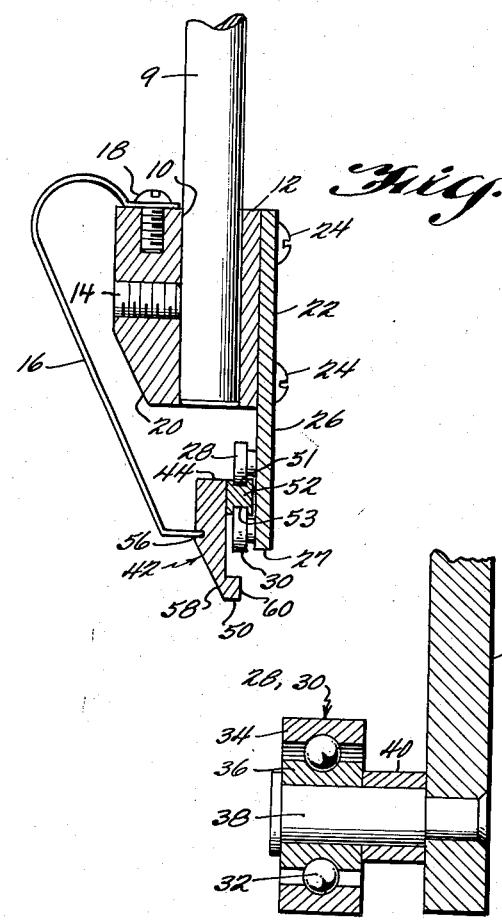
Fig. 3
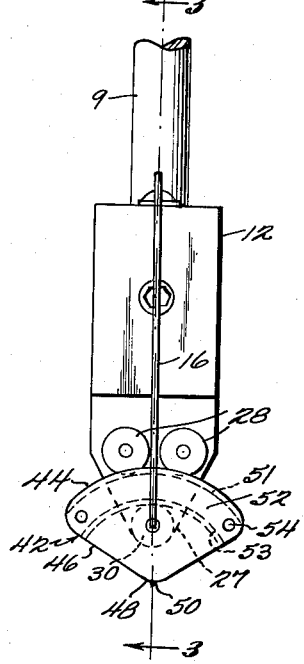
Fig. 2
Fig. 6
INVENTOR
REINO H. MUSTONEN
BY *signature*
ATTORNEY July 4, 1961

R. H. MUSTONEN 2,990,617

COMPENSATING PROBE TIP

Filed March 13, 1959

2 Sheets-Sheet 2

INVENTOR
REINO H. MUSTONEN

BY *G. L. De Wyatt*
ATTORNEY

United States Patent Office 2,990,617
Patented July 4, 1961

2,990,617
COMPENSATING PROBE TIP
Reino H. Mustonen, Wixom, Mich., assignor to General Motors Corporation, Detroit, Mich., a corporation of Delaware
Filed Mar. 13, 1959, Ser. No. 799,358
6 Claims. (Cl. 33—23)

This invention relates generally to probe tips and more particularly to a probe tip which automatically compensates for the thickness of the probe.

Conventional probes are unsatisfactory because errors arise due to the thickness of the probe tip. Either a round tip or a needle tip with finite thickness or radius will give an inaccurate indication when measuring a curved contour, since a portion of the tip spaced from its center line will contact the surface thereby preventing the measurement by the center of the probe. Probes with very thin tips used to minimize this error are apt to wear rapidly or imbed into the surface of the templet or model, thereby producing further errors and necessitating frequent readjustments or replacements.

Figure 5:
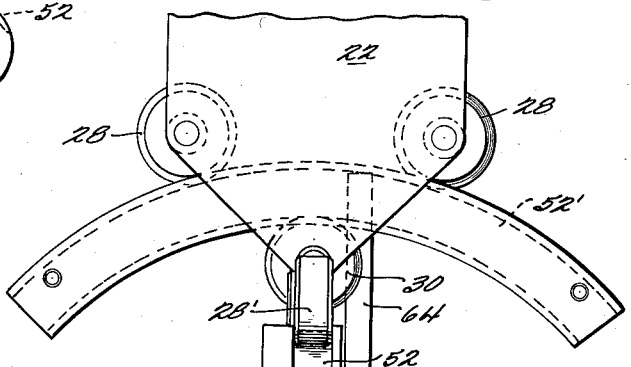
Figure 7:
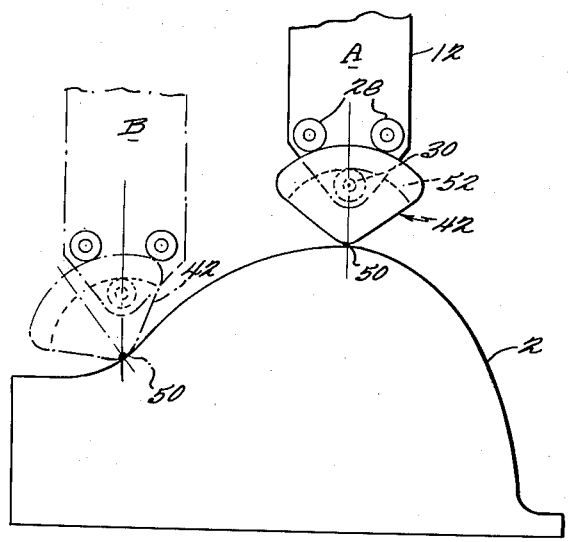

The objects of this invention are to provide a probe tip in which errors do not arise due to the thickness of the probe and at the same time to provide a tip large enough to avoid excessive wear. The above and other objects and advantages of this invention will be made more apparent from the following description when read in connection with the accompanying drawings wherein like reference numerals refer to like parts and wherein:

FIG. 1 is a schematic illustration of a typical prior art probe tip;
FIG. 2 is a front elevational view of one embodiment of a probe tip in accordance with the present invention;
FIG. 3 is a sectional view of FIG. 2 taken along the center line 3—3;
FIG. 4 is a front elevational view of a second embodiment of a probe tip in accordance with the present invention;
FIG. 5 is a side elevational view of the embodiment of FIG. 4 with a portion broken away;
FIG. 6 is a detailed view of a roller assembly shown in FIGS. 2, 3, 4 and 5; and
FIG. 7 is a schematic illustration of the operation of the probe tip in accordance with the present invention.

Referring to FIG. 1, which schematically illustrates a typical prior art device for measuring the contour of a templet or model 2, a round end probe 4 is held by a standard height gauge or a scanning machine 6. When the probe is in the position A contacting a horizontal segment of templet 2, an accurate measurement is obtained. However, when the probe moves to position B, it contacts the templet at point 7, spaced from the center line of the probe rather than point 8 on the center line. It is clear that the thickness of the probe prevents the center portion of the tip from reaching the point 8, thereby causing an error X in the measurement of the height of point 8. Though this error may be reduced by using a fine needle tip, the error cannot be eliminated because the tip will have some finite thickness. Further, the fine needle tip is subject to breakage and excessive wear.

In FIGS. 2 and 3 a supporting rod 9 is attached at its upper end to a height gauge or scanning machine, not shown. The lower end of rod 9 is inserted in a vertical cylindrical hole 10 in a probe body 12 and is held in place by a set screw 14. A wire spring 16 is attached to the top of probe body 12 by a fastening means such as a screw 18. The spring 16 extends to a point below the probe body for a purpose to be described. A chamfer 20 is provided on the lower front corner of body 12 to avoid interference of the body 12 with spring 16.

The body 12 includes a plate 22 fastened to the back of the body by screws 24 or other means. The lower portion 26 of the plate extends below the probe body 12 and is tapered to form a rounded point 27. Two rollers 28 are placed symmetrically on the lower portion 26 of the plate 22. A third roller 30 is secured at the rounded point 27 below the rollers 28, and is on the center line of the probe body as seen in the front elevation view (FIG. 2).

The rollers 28 and 30, as shown in detail in FIG. 6, are miniature ball bearings having an outer race 34 formed integrally with the rollers 28, 30. An inner race 36 which helps retain the complement of balls 32 is supported by a rivet 38 which in turn serves to fasten the roller assembly to the plate 22. A sleeve 40, also supported by the rivet, serves to space the roller assembly from the plate 22. In practice, any suitable antifriction device could be used in place of the roller bearings.

The probe tip includes a fan-shaped head 42 which comprises an arcuate top portion 44, inclined sides 46 and a rounded bottom 48. The central part of the bottom 48 includes a contact point 50. A circularly arcuate rail 52, having an H-shaped section, is fastened adjacent the top portion 44 by means of screws 54. The center of curvature of the rail 52 is the contact point 50. This rail cooperates with the rollers 28 and 30 such that the head is able to rotate about the contact point 50 which then acts as a pivot point and also is firmly supported by the rollers. The rollers 28 engage the top groove 51 of the rail 52 and roller 30 engages the bottom groove 53.

A cavity 56 is formed in the head to receive the lower end of the wire spring 16. The spring therefore helps to center the head 42 to the neutral position.

The roller portion of the head 42 is tapered, as at 58, to avoid unnecessary bulk at the contact point. However, an integral rearwardly projecting portion 60 at the rounded bottom 48 of the head provides sufficient mass to prevent excessive wear and places the contact in the approximate plane with the supporting bearings.

The embodiment of the invention of FIGS. 4 and 5 comprises a second set of rollers 28' and 30' and a second rail 52' disposed at right angles to the rollers 28, 30 and rail 52 which latter correspond to those of FIGS. 2 and 3. In this instance the rollers 28', 30' are mounted on an adapter 62 to supportingly engage the rail 52. The adapter includes an arm 64 secured to and depending from the rail 52'. The rail 52' is supported by rollers 28, 30 mounted on the body plate 22. The contact point 50 on the head 42 is the center of curvature of rail 52' as well as rail 52. Hence as the head 42 swivels in any direction with respect to the body 12, the contact point 50 will remain on the center line of the probe.

It is readily seen that the probe of FIGS. 2 and 3 is limited to the elimination of errors in the measurement of a two-dimensional curve while the embodiment of FIGS. 4 and 5 is accurate for a compound three-dimensional curve.

The two-dimensional probe can be converted to a three-dimensional probe by removing the head 42 from the body 12 and connecting the adapter 62 between the body and the head.

The operation of the compensating probe tip is illustrated in FIGURE 7 wherein the shape of templet 2 is to be measured by determining the height of each point along the surface. In position A the probe head 42 contacts a horizontal segment of the surface and is aligned symmetrically with the probe body 10 so that the contact point 50 is on the center line of the probe and touches the surface of the templet 2. In position B at which the probe is measuring an inclined portion of the surface, the head has rotated throughout an angle such that the contact point 50 touches the surface of the templet 2 without any interference between the probe and the templet due to the thickness of the probe tip. Most importantly, the contact point 50 remains on the center line of the probe, since it is the pivot point or center of rotation of the head.

The head automatically rotates to accommodate the inclination of the surface at the point to be measured. The only way in which the head can be rotated is by a force acting on the head which force does not pass through the pivot point. Since the antifriction rollers bear against a circularly arcuate rail, the only forces which can be transmitted to the head by the probe body are radial forces passing through the pivot point 50. Consequently, these forces cannot serve to rotate the head when the pivot point 50 is in contact with the templet surface. Likewise when the contact point or pivot point 50 engages the templet surface 2, the force exerted upon the head by the templet cannot rotate the head 42 since the force acts through the pivot point. Thus, in this position, the head is in equilibrium. However, if he head 42 is engaged by the templet at some point other than the pivot point 50, the force exerted by the templet 2 will not act through the pivot pin and will serve to rotate the head into its equilibrium position.

Hence, it is seen that a probe of this type, wherein the point of contact is coincident with the pivot point and also lies on the center line of the probe, can be used to measure contoured surfaces without giving rise to errors due to the thickness of the probe tip. This type of probe is suitable for measuring the surfaces of objects such as Keller models, templets, stampings, clay models, and similar surfaces.

What I claim is:

1. A compensating probe tip comprising a body, said body having upper and lower rollers mounted thereon, a head having an upper and a lower edge, a contact point on said lower edge and a circularly arcuate flange extending from the upper edge having the contact point as its center of curvature, said flange rotatably engaging said rollers and having the contact point as the point of rotation of the head.

2. A compensating probe tip comprising a body, said body having mounted thereon two upper rollers aligned horizontally, and a third lower roller spaced below the said upper rollers, all of said rollers being mounted on antifriction bearings, a head having an arcuate upper edge and a curved lower edge, a contact point on the lower edge, the said contact point being the center of curvature of said upper edge, a rearwardly extending support flange secured at the head adjacent to and concentric with said upper edge, said flange having upper and lower grooves rotatably cooperating with the said upper rollers and lower rollers respectively, with the contact point acting as the point of rotation of the head, the head having a cavity, and a wire spring fastened atop the probe and extending into said cavity to movably center the head on the probe.

3. A compensating probe tip comprising a body having a first set of rollers thereon, an adapter having a circularly arcuate flange extending therefrom and rotatably and supportably engaging said set of rollers, said adapter having a second set of rollers thereon, a head having an upper and a lower edge, a contact point on said lower edge and a second circularly arcuate flange extending from the upper edge at right angles to said first flange, said second flange rotatably and supportably engaging said second set of rollers, the center of curvature of each flange being coincident with the contact point, and having the contact point as the point of rotation of the head.

4. A probe tip comprising a body, an adapter, a head having a contact point thereon, means on said body to rotatably support said adapter with the contact point as the center of rotation, and means on said adapter to rotatably support said head with the contact point as the center of rotation.

5. A compensating probe tip comprising a body, said body having mounted thereon a set of rollers including two upper rollers aligned horizontally, and a third lower roller spaced from the said upper rollers, an adapter having mounted thereon a second set of rollers including two upper rollers and a lower roller, all of said rollers being mounted on antifriction bearings, said adapter comprising a first circularly arcuate rail of H-shaped cross section defining upper and lower grooves, said first set of rollers engaging said upper and lower grooves of said first rail to rotatably support said adapter, a head having an arcuate upper edge and a curved lower edge, a contact point on the lower edge, a rearwardly extending second arcuate rail of H-shaped cross section secured to said head adjacent to and concentric with said upper edge, said second rail disposed at right angles to the first rail, said contact point being the center of curvature of both rails, the second rail rotatably engaging said second set of rollers, with the contact point being coincident with the point of rotation of the head.

6. A compensating probe tip comprising a body, said body having mounted thereon two upper rollers aligned horizontally, and a third lower roller spaced below the said upper rollers, a head having an arcuate upper edge and a curved lower edge, a contact point on the lower edge, the said contact point being the center of curvature of said upper edge, an arcuate support flange secured at the head concentric with said upper edge, said flange rotatably cooperating with the said upper rollers and lower rollers, and with the contact point acting as the point of rotation of the head.

References Cited in the file of this patent
UNITED STATES PATENTS

| 1,694,022 | Shaw et al. | Dec. 4, 1928 |
| 2,831,260 | Shaw | Apr. 22, 1958 |